J. E. BISSELL.
POWER TRANSMITTING MECHANISM.
APPLICATION FILED JUNE 28, 1909.
1,038,833.
Patented Sept. 17, 1912.
4 SHEETS—SHEET 1.
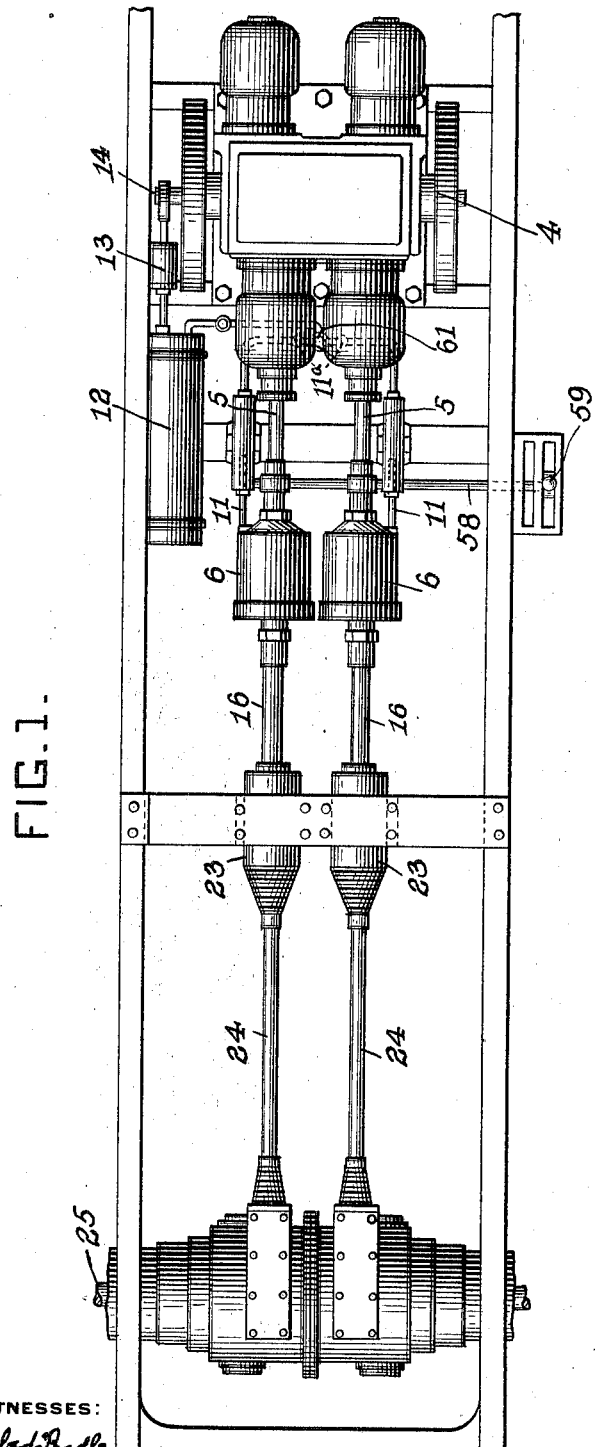
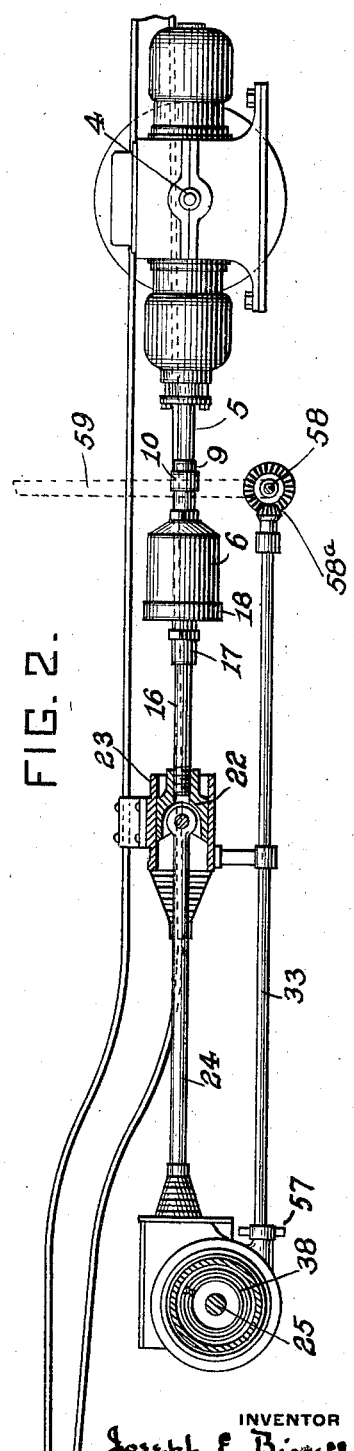
WITNESSES:
INVENTOR

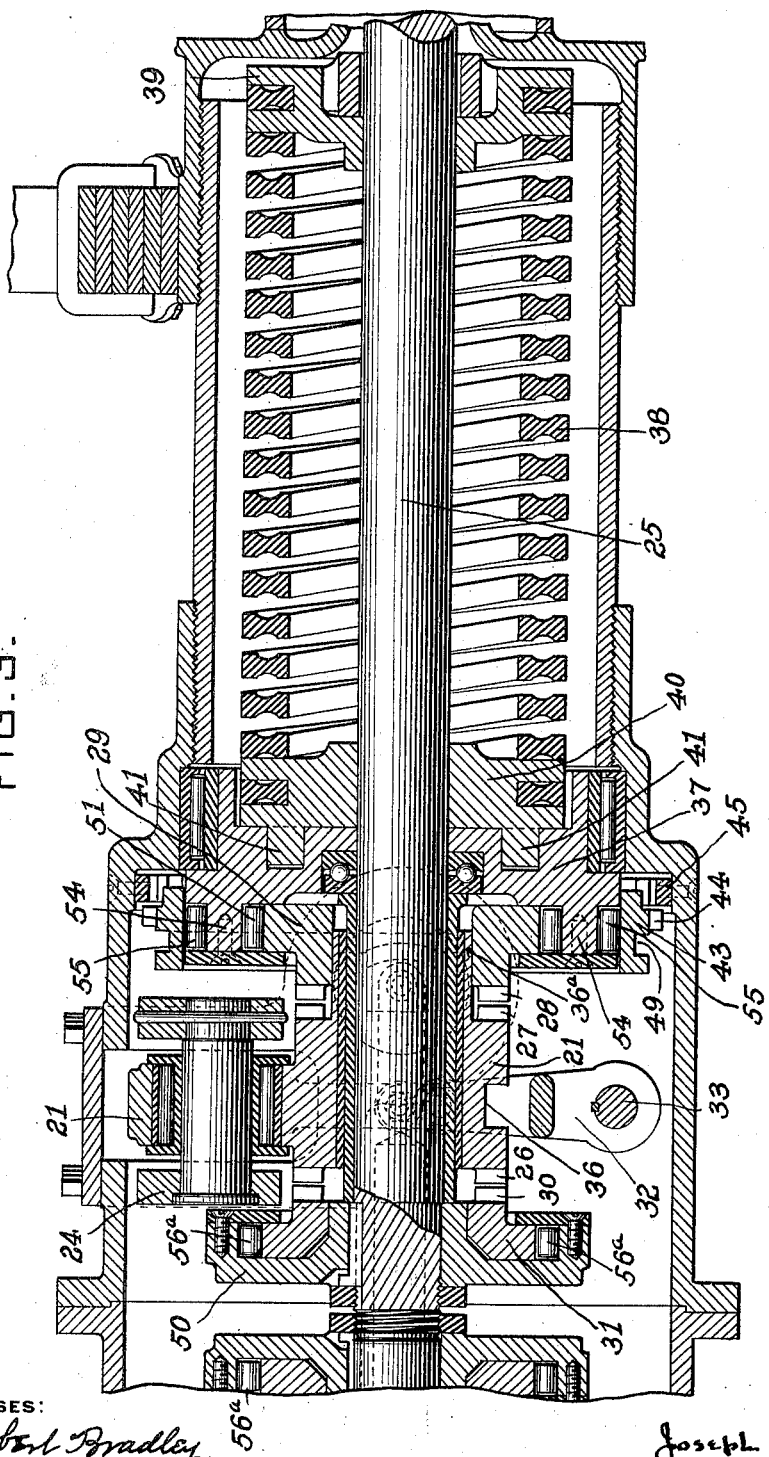

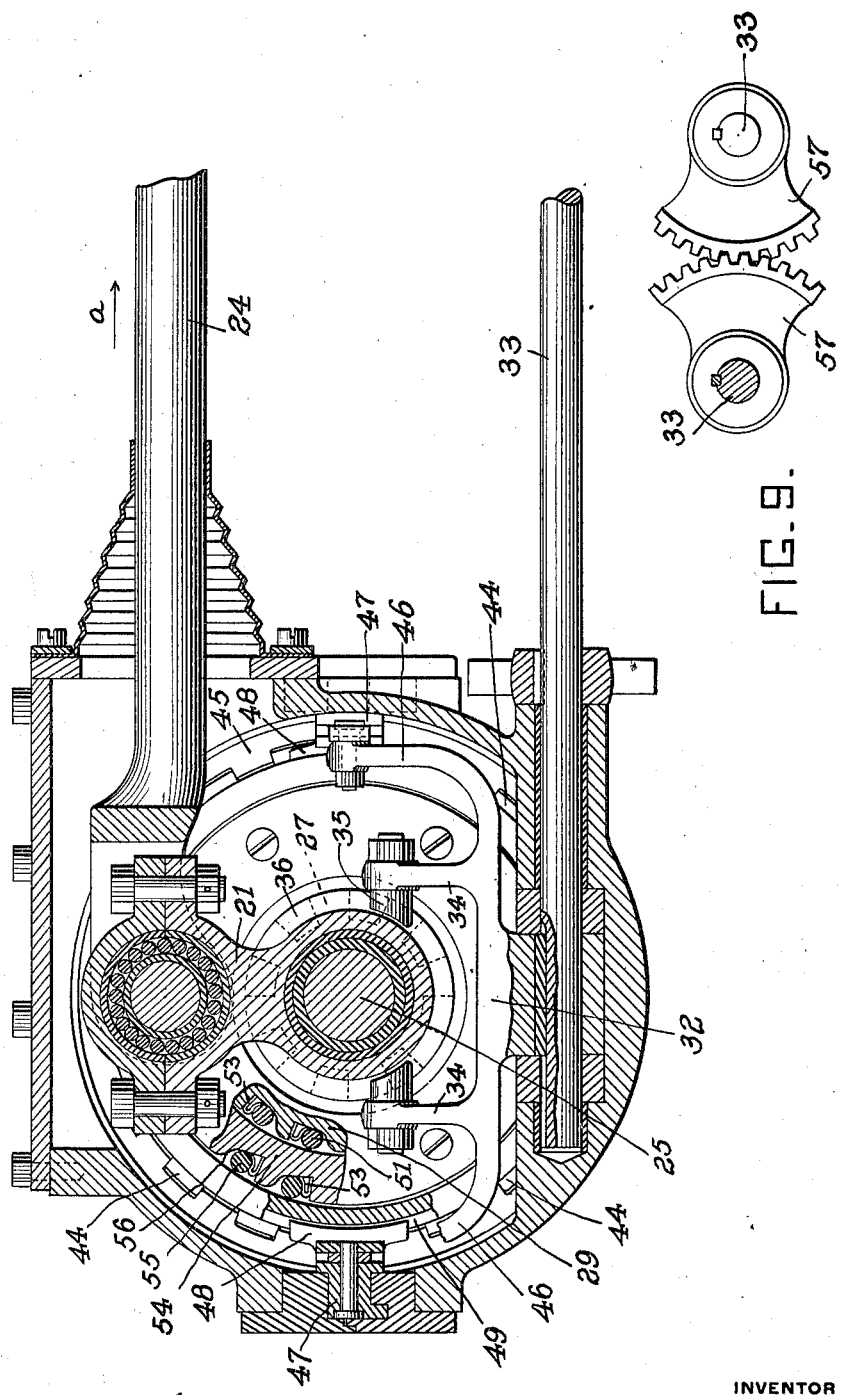

J. E. BISSELL.
POWER TRANSMITTING MECHANISM.
APPLICATION FILED JUNE 28, 1909.
1,038,833.
Patented Sept. 17, 1912.
4 SHEETS—SHEET 4.
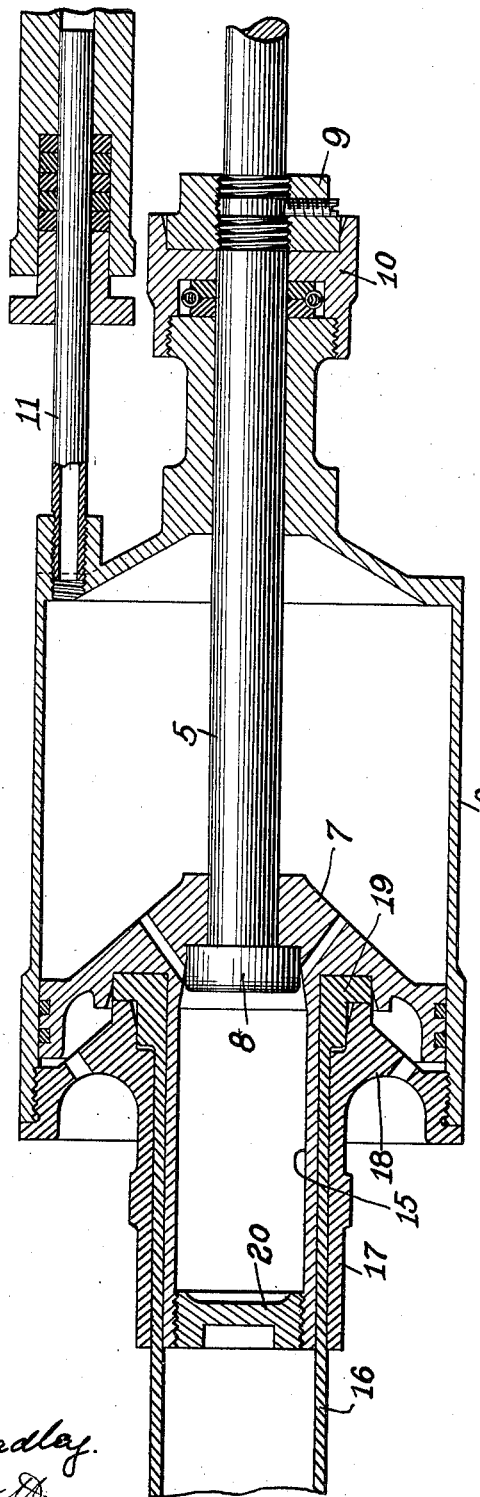
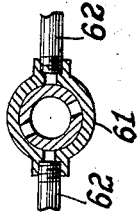
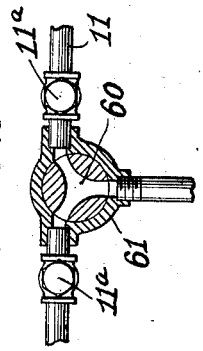
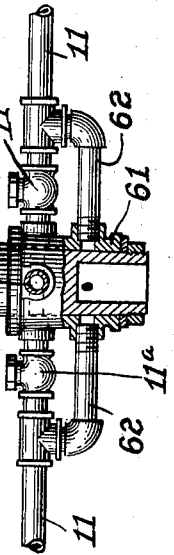
WITNESSES:
J. Herbert Bradley.
Charles Barnett.
INVENTOR
Joseph E. Bissell
by Christy & Christy
Atty's

UNITED STATES PATENT OFFICE.

JOSEPH E. BISSELL, OF PITTSBURGH, PENNSYLVANIA.

POWER-TRANSMITTING MECHANISM.

1,038,833. Specification of Letters Patent. Patented Sept. 17, 1912.

Application filed June 28, 1909. Serial No. 504,781.

*To all whom it may concern:*

Be it known that I, JOSEPH E. BISSELL, residing at Pittsburgh, in the county of Allegheny and State of Pennsylvania, a citizen of the United States, have invented or discovered certain new and useful Improvements in Power-Transmitting Mechanism, of which improvements the following is a specification.

The invention described herein relates to certain improvements in mechanism for transforming reciprocating into rotary motion, such improvement being especially applicable for the transmission of power from the motors to the driving wheels of an automobile.

The invention has for its object certain improvements in the type of mechanism forming the subject-matter of application No. 484,741 filed by me March 20th, 1909.

The invention is hereinafter more fully described and claimed.

In the accompanying drawings forming a part of this specification, Figure 1 is a top plan view illustrating the chassis of an automobile with the motors and their connections to the rear or driving axle. Fig. 2 is a side elevation partly in section of the construction shown in Fig. 1. Fig. 3 is a sectional elevation on a vertical plane passing longitudinally through the center of the rear axles, showing one axle and the connections thereto entire and a portion of the other axle. Fig. 4 is an enlarged sectional view in vertical plane, transversely through one axle, illustrating the resilient connection between the motor and the axle. Fig. 5 is an enlarged view in horizontal longitudinal section of one of the controlling cylinders 6 shown in Fig. 1. Figs. 6, 7 and 8 are views partly in elevation and partly in section of the valve mechanism which controls the supply of fluid to and from the cylinders 6. Fig. 9 is a detail illustrating the means preferably employed for shifting simultaneously two power mechanisms, a matter which will be more fully explained in the specification.

In the practice of my invention as applied to automobiles, any suitable motor is employed, preferably one having two, four, or more cylinders suitably arranged, so that the respective pistons are connected to a common shaft carrying fly-wheel 4. The piston rods 5 of these motor cylinders, extend into cylinders 6 and through the pistons 7 of such cylinders. The ends of the rods 5 are provided with heads 8 engaging the pistons so that the latter will be moved by the piston rods only during the forward strokes of the engine. The piston rods 5 are provided with shoulders or abutments 9 which will bear against the front ends of the cylinders during the backward stroke of the pistons. These bearings of the shoulders 9 are preferably against glands 10 of the cylinders. The front ends of the controlling cylinders 6 are connected by pipes 11 to reservoirs 12 in which air under pressure is maintained by a pump 13 operated in any suitable manner, preferably by a crank pin 14 on the fly-wheel shaft of the engine. These pipe connections are provided with check valves 11$^a$ permitting the flow of fluid to the cylinders 6 but preventing any back flow, or flow from one cylinder to the other. The pistons 7 are provided with rearward extensions 15 fitting within the tubular connecting rods 16 which have their forward ends connected as shown to the rear ends of the cylinders 6. This connection is preferably formed by passing the tubular connecting rods 16 through sleeve-like extensions 17 on the heads 18 of the cylinders 6 and forming shoulders on the ends of said rods engaging the cylinder heads, which as shown are screwed into the rear ends of the cylinders.

As will readily be understood, on the forward stroke of the engine the cylinders will be caused to move with the piston by reason of the air pressure maintained in the cylinder, until the resistance to movement from the wheels connected to the rod 16 exceeds the pressure of the air, thereupon the pistons will be moved independent of the cylinders, compressing the air. The cylinders 6 should be made of such length relative to the throw of the crank pins to which the rods 5 are connected, that the pistons 7 may make a complete stroke without shifting the cylinder. Hence unless the resistance of the fluid within the cylinder reaches a point in excess of the power of the engine, the latter can never be stalled or stopped as the possible length of movement of the pistons 7 is greater than the throw of the crank. By thus permitting the operation of the engine without imparting any movement to the wheels to be driven, it will be possible to get up a high speed on the engine by increasing the pressure of fluid within the cylinders to get increased power, due to increased momentum of the engine to turn the wheels.

It will be observed by reference to Fig. 5 that in the backward movement of the rods 5 the heads 8 move along the tubular guide extensions 15 of the pistons 7. This extension is closed at its rear end by a plug 20 to do away with a packing joint that would otherwise be necessary in a very inconvenient place, and passages are formed through the piston to admit fluid pressure into the extension for equalizing pressure readily and to provide a cushioning action to slowly check the rods while moving independent of the cylinders. While the connecting rods 16 may if desired extend back to the axle and be connected directly to a reciprocating arm 21, it is preferred to employ guideways intermediate of the motor and the axle as shown in Figs. 1 and 2 to withstand the vibration. In this construction the connecting rods 16 are secured at their rear ends to sliding heads 22 mounted in guides 23 supported in a cross bar of the chassis. Rods 24 are pivotally connected at their front ends to the cross head and at their rear ends to the arms 21.

As shown in Fig. 3 the rear wheels are operatively connected to the independent axles, which have independent connections to the motor. While such connections are independent they are similar in construction, but are so adjusted that a driving connection from the engine is formed with said axles alternately. When such connection is established the axle is not only rotated but at the same time power is stored up which will become operative on such axle after the driving connection with the motor is broken with said axle, and is established with the other axle. In other words, while the motor is connected intermittently to each axle, rotative power is applied continuously to each axle. Each arm 21 is loosely mounted upon its axle, so as to be free to oscillate upon the same.

As shown in Figs. 3 and 4, the hub portion of the reciprocating arm 21 is provided on both ends with laterally extending teeth 26 and 27 which, when the arm is shifted to the right in Fig. 3, will engage similar teeth 28 on a disk 29, and when shifted to the left will engage teeth 30 on a disk 31. The movement of the arm along the shaft can be effected by any suitable means, but preferably by a rock arm 32 secured to a rod 33 extending to the front of the machine, where said rod may be rotated by any suitable means. The rock arm 32 is provided as shown in Fig. 4 with lugs 34 projecting up on opposite sides of the hub of the arm 21 and provided with blocks 35 engaging a groove 36 in the hub. When this shaft and the arm 32 are rocked in one direction the reciprocating arm 21 will be shifted to effect an engagement of the teeth 27 with the teeth 28 of the disk 29 and when moved in the other direction the teeth or projections 26 will interlock with the teeth or projections of the disk 31.

The disk 29 is as shown in Fig. 3 mounted so as to turn loosely around the shaft, its bearing being preferably formed by an extension 36$^a$ of the hub of the reciprocating arm 21. This disk 29 is constructed or provided with suitable means, when the reciprocating arm 21 is moved forward toward the front of the machine, to effect a locking of the disk with a second disk 37 capable of movement around the shaft or axle 25. This disk 37 is connected to one end of a resilient member 38 while the opposite end of this member is secured to an annular block 39 keyed or otherwise secured to the axle 25. It is preferred to connect the inner end of the resilient member 38 to the disk 37 through the medium of an annular head 40 provided with pins 41 constructed to enter sockets in the disk 37.

It will be apparent that when the disk is rotated by means of the reciprocating arm 21, no movement will be imparted to the shaft 25 except through the medium of the resilient member 38. The disk 29 will engage the disk 37 only when the former is turned in the desired direction of movement or rotation of the shaft 25. When the disk 29 is moved back by the reciprocating arm, suitable means must be employed to prevent the disk 37 moving back therewith under the tension of the spring or resilient member 38. A desirable construction to this end consists of a ring 43 surrounding the disk 37 but movable transversely thereof as hereinafter described. Suitable means are employed whereby the disk 37 will engage the ring 43 when a backward movement would be imparted to the disk 37 by the tension of the spring 38. The ring 43 is provided on its outer periphery with a series of projections 44 adapted to engage notches in the periphery of a flange 45 secured to the stationary casing surrounding the shaft and the operating parts. This disk retaining means should be capable as stated of movement transverse of the disk so that when it is desired to back the automobile, the ring 43 may be shifted out of engagement with the flange 45. It is preferred that the transverse movement of the ring 43 should be effected by means of the rod 33 whereby the reciprocating arm 21 is shifted. To this end the rocker arm 32 is provided with additional arms 46 which are connected to sliding blocks 47 mounted in the casing of the axle. These blocks 47 are provided with projections 48 constructed to engage a peripheral groove 49 in the ring 43. It is preferred that the several parts should be so constructed and arranged that, on the movement of the rocker arm 32, the teeth 27 and 28 will engage just before the teeth 44 engage notches 45. By this means a sliding back and forth movement will be imparted to the ring 43 so that the teeth 44 will be brought into alinement with the notches 45.

When it is desired to reverse the automobile or impart a reverse rotation to the shaft or axle 25, the rod 33 is turned to cause the teeth 44 to pass out of engagement with the notches 45 and the teeth 27 out of engagement with the teeth 28. This movement of the rocker arm 32 is continued so as to cause the teeth 26 to engage the teeth 30 on the disk 31. The latter is provided with suitable means whereby it will engage a head 50 keyed to the shaft or axle 25 only when the disk is moved backward or during the backward stroke of the reciprocating arm 21. As a backward movement is desired only occasionally, and that to a limited extent, the interposition of a spring or resilient member between the head 50 and the shaft is not deemed necessary, although it may be used if desired.

While any suitable form or construction of means may be employed for effecting the engagement of the disk 29 with the disk 37 and the latter with the retaining ring 43 and also the disk 31 with the head 50, it is preferred to employ a roller construction as clearly shown, in Fig. 4. As therein shown rollers 51 are arranged in notches in the peripheries of the disks 29 and 31 and 37. Springs 53 are so arranged in these notches as to tend to push the rollers up along an inclined portion of the notches or in a direction to cause them to wedge between the bottom of the notches and the inner periphery of the surrounding part. The notches and springs in the disk 29 are so arranged and constructed that the rollers will be caused to wedge against the inner periphery of the flange 54 of the disk 37 only when motion is imparted to the disk 29 on the forward stroke of the engine. By reference to Fig. 4 it will be seen that when the disk 29 is moved in the direction of the arrow $a$ the inclined portion of the notches of the periphery of such disk will move under the rollers and thereby cause a wedging action of the rollers with the inner periphery of the flange 54. The rollers 55 and notches 56 in the outer periphery of the flange 54 are arranged the reverse of those in the periphery of the disk 29, so that when this disk 37 is freed from the pull of the arm 21 and there is a tendency to effect a backward movement of the disk 37 by the resilient element 38, the rollers will engage the inner periphery of the retaining ring 43, and thereby check such reverse movement, the retaining ring being in engagement with the flange 45. The rollers 56$^a$ and their notches in the periphery of the disk 31 are so constructed and arranged that the disk 31 will be in engagement with the head 50 only when the disk 31 is moved backward or in a direction to effect a backward movement of the automobile.

While the rods 33 for shifting the pawl members on the several shaft sections may be operated independently, it is preferred that the several pawl members 21 should be shifted to position for forward or backward movement simultaneously. To this end both rods 33 are operatively connected by toothed segments 57, and one of these rods 33 only is extended forward, and it may be rotated by a lever 59 or other suitable means adjacent to the driver's seat. Bevel pinions 58$^a$ turned by the lever 59 may turn the rods 33 and thereby shift the arms 21.

On the forward movement of the arms 21, the resilient members 38 will be placed under a tension at least sufficient to overcome the resistance of the load, and the power will be yieldingly applied to the axle, and not as a blow. When the arms 21 begin their backward movement the tendency of the disks 37 to follow such movement is prevented by the retaining rings 43, so that the tension under which the resilient members were placed will be applied to the axles to effect a forward drive. This continued application of power to the axles after the arms 21 begin to move back prevents the jar due to the stoppage of an intermittently applied power.

In passing around curves, the inner wheel meets with greater resistance than the outer wheel, and hence it is desirable to provide for a proportioning of the power to the resistance presented by the respective wheels, to permit of a retardation of the rate of rotation of the inner wheel. This is effected in the present invention by the interposition of resilient members in the form of the fluid pressure cylinders 6 and pistons 7 between the reciprocating arms 21 and the engines. As the same fluid pressure is maintained in both controlling cylinders, the same compression will occur in both when the loads on the wheels are the same. But when the load on one wheel is increased, a greater compression will occur in the cylinder connected to such wheel, permitting a retardation of the wheel and also rendering the connection from the motor to the arm driving such wheel more nearly rigid, so that a greater percentage of the power of the engine is applied to the wheel.

The motor may consist of a single unit, of two or more units, or two or more pairs of units, as is well known in the art. When a plurality of units or pairs of units are used, they would be connected at angles to the power shaft 4, which will have a plurality of connections to the shaft or shafts to be driven, the points of such connections being angularly arranged around the power shaft, the angle or angles being dependent upon the members of such connections. It will be understood that, where a plurality of motor units are employed, the interposition of the power shaft 4 between them and the shaft or shafts to be driven is desirable, in order that the operation of the units may be uniform relative one to the other.

Under the term driving part or member as herein used is included not only a single motor unit, but also a plurality of units operating uniformly relative one to the other on the part to be driven through independent connections thereto, and a plurality of units operating through a shaft having a plurality of independent operating connections extending therefrom.

It is characteristic of the employment of a variable fluid pressure part or member, between a motor and the part to be driven thereby; that, by allowing the partial or entire reduction of pressure in such connection, the motor can be operated without affecting the part to be driven, and then by the admission of pressure there will be a progressively increasing application of the power of the motor to the part to be driven. If this pressure be increased to or above the fluid pressure operating to drive the motor, the connection from the latter to the part to be driven will become practically rigid. This feature can be readily employed in transmitting power from a motor, and is especially useful in automobiles, as the clutch may be thrown into engagement, the pressure in the connection reduced, and the motor started. Then, by increasing the pressure, a slow easy start will be effected, even if the motor is running at a very high speed. In the driving mechanism herein shown, the cylinders 6 are connected by pipes 11 to the reservoir 12, the flow to the cylinders being controlled by a suitable valve mechanism which may be so constructed as not only to control the flow of pressure to the cylinder but also its escape therefrom, as shown in Fig. 7. In this construction the admission valve 60 is so constructed that the flow to the cylinders may be reduced or entirely cut off by a further movement of the valve. The valve casing 61 is provided with passages 62 connecting with pipes 11 beyond check valves 11ª. These passages are controlled by an extension of the valve 60 having ports so arranged that when the flow of pressure to the cylinders by the upper portions of the valve is cut off, the escape of pressure therefrom through 62 will occur.

I claim herein as my invention:

1. In a power transmitting mechanism, the combination of a shaft, a disk secured to the shaft, a reciprocating member mounted on the shaft adjacent to said disk, means whereby said member may engage the disk when moving in one direction, a stationary part or member, an annulus surrounding the disk, means for causing the annulus to simultaneously engage the disk and stationary part or member, and means for shifting the annulus.

2. In a power transmitting mechanism, the combination of a shaft, a disk having a yielding connection to said shaft, a reciprocating member mounted on the shaft adjacent to said disk, means whereby said member may engage the disk when moving in one direction, a stationary part or member, an annulus surrounding the disk, means for causing the anulus to simultaneously engage the disk and stationary part or member, and means for shifting the annulus.

3. In a power transmitting mechanism, the combination of a shaft, a disk secured to the shaft, a reciprocating member mounted on the shaft adjacent to said disk, means whereby said member may engage the disk when moving in one direction, a stationary part or member, an annulus surrounding the disk, means for causing the annulus to simultaneously engage the disk and stationary part or member, means for simultaneously shifting the reciprocating member into engagement with the disk and the annulus to position where it will engage both the disk and stationary part or member.

4. In a power-transmitting mechanism, the combination of a driven shaft, a ratchet member rotatable upon said shaft, a pawl member movable longitudinally upon said shaft to make and break engagement with said ratchet member and oscillatory transversely of said shaft to shift said ratchet member when in engagement therewith, connection between said pawl member and a source of power, a disk arranged adjacent to said ratchet member, a casing surrounding said disk, operative resilient connection from said disk to said driven shaft, a wedge member arranged between said ratchet member and said disk causing said disk to turn in unison with said ratchet member when the latter advances and allowing said ratchet member to recede independent of said disk, and a wedge member arranged between said disk and said casing causing said disk to be held against rotation when said ratchet member is receding and allowing said disk to turn in unison with said ratchet member when the latter advances, substantially as described.

In testimony whereof, I have hereunto set my hand.

JOSEPH E. BISSELL.

Witnesses:
 ALICE A. TRILL,
 CHARLES BARNETT.